(12) United States Patent
McGrath et al.

(10) Patent No.: US 9,292,216 B1
(45) Date of Patent: Mar. 22, 2016

(54) CALCULATING AN ALLOCATION MODE FOR A STORAGE POOL BASED ON A POLICY

(75) Inventors: Paul T. McGrath, Raleigh, NC (US); Sheetal A. Desai, Morrisville, NC (US); Miles A. Deforest, Bahama, NC (US); David Haase, Fuquay Varina, NC (US); Saurabh M. Pathak, Jersey City, NJ (US)

(73) Assignee: EMC Corporation, Hopkinton, MA (US)

( * ) Notice: Subject to any disclaimer, the term of this patent is extended or adjusted under 35 U.S.C. 154(b) by 243 days.

(21) Appl. No.: 12/889,477

(22) Filed: Sep. 24, 2010

(51) Int. Cl.
*G06F 3/06* (2006.01)
*G06F 9/50* (2006.01)

(52) U.S. Cl.
CPC ............ *G06F 3/0631* (2013.01); *G06F 3/0604* (2013.01); *G06F 3/0689* (2013.01); *G06F 9/5016* (2013.01)

(58) Field of Classification Search
CPC ... G06F 3/0604; G06F 3/0631; G06F 3/0689; G06F 9/5016
USPC .......................... 711/147, 151, 170; 718/104
See application file for complete search history.

(56) References Cited

U.S. PATENT DOCUMENTS

2007/0180087 A1* 8/2007 Mizote et al. ................. 709/223
2007/0192560 A1* 8/2007 Furuhashi ..................... 711/170
2009/0157998 A1* 6/2009 Batterywala .................. 711/171

* cited by examiner

*Primary Examiner* — Arpan P. Savla
(74) *Attorney, Agent, or Firm* — John T. Hurley; Jason A. Reyes; Krishnendu Gupta

(57) ABSTRACT

An embodiment of a computer-implemented method for use in managing allocation of a storage pool in a data storage system by calculating an allocation mode for the storage pool based on a policy is described. Also described are embodiments of a system and computer program product enabled for carrying out such computer-implemented allocation management.

20 Claims, 4 Drawing Sheets

CALCULATING AN ALLOCATION MODE FOR A STORAGE POOL BASED ON A POLICY

A portion of the disclosure of this patent document may contain command formats and other computer language listings, all of which are subject to copyright protection. The copyright owner, EMC Corporation, has no objection to the reproduction by anyone of the patent document or the patent disclosure, as it appears in the Patent and Trademark Office patent file or records, but otherwise reserves all copyright rights whatsoever.

BACKGROUND

1. Technical Field

This application generally relates to managing pool allocation.

2. Description of Related Art

Computer systems may include different resources used by one or more host processors. Resources and host processors in a computer system may be interconnected by one or more communication connections. These resources may include, for example, data storage devices such as those included in the data storage systems manufactured by EMC Corporation. These data storage systems may be coupled to one or more servers or host processors and provide storage services to each host processor. Multiple data storage systems from one or more different vendors may be connected and may provide common data storage for one or more host processors in a computer system.

A host processor may perform a variety of data processing tasks and operations using the data storage system. For example, a host processor may perform basic system I/O operations in connection with data requests, such as data read and write operations.

Host processor systems may store and retrieve data using a storage device containing a plurality of host interface units, disk drives, and disk interface units. The host systems access the storage device through a plurality of channels provided therewith. Host systems provide data and access control information through the channels to the storage device and the storage device provides data to the host systems also through the channels. The host systems do not address the disk drives of the storage device directly, but rather, access what appears to the host systems as a plurality of logical disk units. The logical disk units may or may not correspond to the actual disk drives. Allowing multiple host systems to access the single storage device unit allows the host systems to share data in the device. In order to facilitate sharing of the data on the device, additional software on the data storage systems may also be used.

Presently, there is a trend toward the use of larger operating systems, larger applications or programs, and larger file sizes. Understanding this trend, a storage administrator is likely to request the provisioning (i.e., allocation) of a larger portion of storage space than is currently required for an operating system, for example, with the expectation that the space requirements will grow with upgrades, bug-fixes, the inclusion of additional features, and the like. Problems in this environment may result in difficulties, for which a solution is needed.

SUMMARY

An embodiment of a computer-implemented method for use in managing allocation of a storage pool in a data storage system by calculating an allocation mode for the storage pool based on a policy is described. Also described are embodiments of a system and computer program product enabled for carrying out such computer-implemented allocation management.

BRIEF DESCRIPTION OF THE DRAWINGS

Features and advantages of the present invention will become more apparent from the following detailed description of exemplary embodiments thereof taken in conjunction with the accompanying drawings in which.

DETAILED DESCRIPTION

Figure 1:
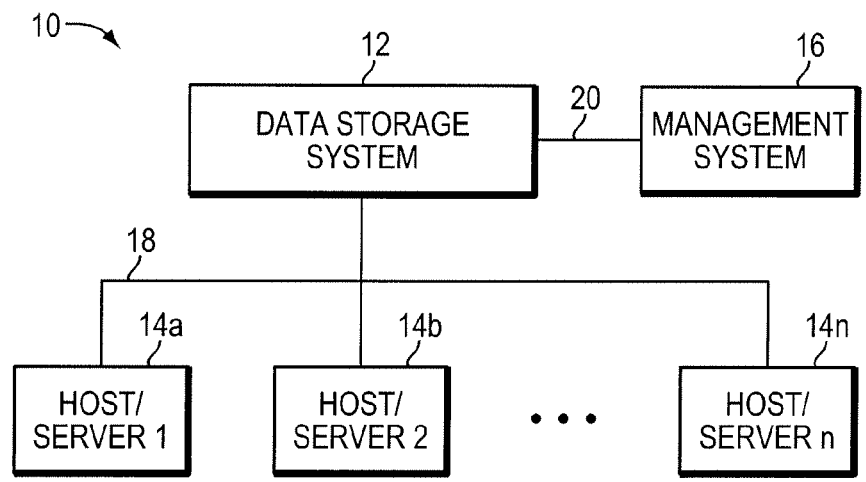
FIG. 1 is diagram of an embodiment of a storage system that may be used in connection with managing pool allocation.

In accordance with the subject matter disclosed herein, systems, methods, and computer readable media for managing pool allocation are provided. Reference will be made in detail to exemplary embodiments of the present subject matter, examples of which are illustrated in the accompanying figures. Although the invention is described with reference to specific embodiments, it will be evident to one skilled in the art that various modifications and changes may be made to the specific embodiments without departing from the broader spirit and scope of the invention as set forth in the appended claims. Wherever possible, the same reference numbers will be used throughout the drawings to refer to the same or like parts.

The inventors have critically recognized solutions for problems associated with data storage underuse that typically arises when the amount of storage space is fully provisioned and allocated to, but is not used by, an operating system, program, process, or user. In this scenario, the disk storage space is unused by the entity that requested its allocation and is also rendered unavailable for use by any other entity. In such cases, the unused space cannot be simply given back to a common storage pool where it may become accessible to other users. For example, a database installation may require many terabytes of storage over the long term even though only a small fraction of that space may be needed when the database is first placed into operation. In short, the large storage space may eventually be needed, but it is not known exactly when the entire space will be required. In the meantime, the allocated storage space lies unused by the requested user and may not be utilized by any other user.

In recognition of the fact that more storage space may be provisioned for operating systems, programs, and users than can actually be used at first, the concept of a sparsely populated logical unit (LU), such as a "thin" logical unit (TLU), was developed. Unlike the more traditional fully allocated logical unit, which is created by fully provisioning and an entire initial amount of storage area, a sparsely populated logical unit is provisioned at creation but is not allocated any physical storage until the storage is actually needed. Specifically, a TLU resolves this problem by allocating the storage space (e.g., making the memory space physically available) as it is needed when (or shortly before) data is written to the TLU. A TLU is created from a common pool of physical storage space and starts with minimal amount of physical storage space. As the application that is using the TLU starts to demand more storage, the TLU incrementally requests the storage space from the common storage pool in portions referred to as slices.

Although the TLU enables a user to avoid allocating unnecessary storage space from a common storage pool, the inventors have recognized that there are still some instances where storage space in the storage pool is limited. This may create competition for storage space in the pool among storage requests of various priorities. Accordingly, there exists a need for systems, methods, and computer readable media for managing pool allocation, which is now described below.

Referring to FIG. 1, shown is an example of an embodiment of a system that may be used in connection with the current invention. The system 10 includes one or more data storage systems 12 connected to server or host systems 14a-14n through communication medium 18. The system 10 also includes a management system 16 connected to one or more data storage systems 12 through communication medium 20. In this embodiment of the system 10, the management system 16, and the N servers or hosts 14a-14n may access the data storage systems 12, for example, in performing input/output (I/O) operations, data requests, and other operations. The communication medium 18 may be any one or more of a variety of networks or other type of communication connections as known to those skilled in the art. Each of the communication mediums 18 and 20 may be a network connection, bus, and/or other type of data link, such as a hardwire or other connections known in the art. For example, the communication medium 18 may be the Internet, an intranet, network or other wireless or other hardwired connection(s) by which the host systems 14a-14n may access and communicate with the data storage systems 12, and may also communicate with other components (not shown) that may be included in the computer system 10. In one embodiment, the communication medium 20 may be a LAN connection and the communication medium 18 may be an iSCSI or fibre channel connection.

Each of the host systems 14a-14n and the data storage systems 12 included in the system 10 may be connected to the communication medium 18 by any one of a variety of connections as may be provided and supported in accordance with the type of communication medium 18. Similarly, the management system 16 may be connected to the communication medium 20 by any one of variety of connections in accordance with the type of communication medium 20. The processors included in the host computer systems 14a-14n and management system 16 may be any one of a variety of proprietary or commercially available single or multi-processor system, such as an Intel-based processor, or other type of commercially available processor able to support traffic in accordance with each particular embodiment and application.

It should be noted that the particular examples of the hardware and software that may be included in the data storage systems 12 are described herein in more detail, and may vary with each particular embodiment. Each of the host computers 14a-14n, the management system 16 and data storage systems may all be located at the same physical site, or, alternatively, may also be located in different physical locations. In connection with communication mediums 18 and 20, a variety of different communication protocols may be used such as SCSI, Fibre Channel, iSCSI, and the like. Some or all of the connections by which the hosts, management system, and data storage system may be connected to their respective communication medium may pass through other communication devices, such as a Connectrix or other switching equipment that may exist such as a phone line, a repeater, a multiplexer or even a satellite. In one embodiment, the hosts may communicate with the data storage systems over an iSCSI or a Fibre Channel connection and the management system may communicate with the data storage systems over a separate network connection using TCP/IP. It should be noted that although FIG. 1 illustrates communications between the hosts and data storage systems being over a first connection, and communications between the management system and the data storage systems being over a second different connection, an embodiment may also use the same connection. The particular type and number of connections may vary in accordance with particulars of each embodiment.

Each of the host computer systems may perform different types of data operations in accordance with different types of tasks. In the embodiment of FIG. 1, any one of the host computers 14a-14n may issue a data request to the data storage systems 12 to perform a data operation. For example, an application executing on one of the host computers 14a-14n may perform a read or write operation resulting in one or more data requests to the data storage systems 12.

The management system 16 may be used in connection with management of the data storage systems 12. The management system 16 may include hardware and/or software components. The management system 16 may include one or more computer processors connected to one or more I/O devices such as, for example, a display or other output device, and an input device such as, for example, a keyboard, mouse, and the like. A data storage system manager may, for example, view information about a current storage volume configuration on a display device of the management system 16, provision data storage system resources, and the like.

In one embodiment, the one or more data storage systems 12 of FIG. 1 may be an appliance with hardware and software for hosting the data storage of the one or more applications executing on the hosts 14a-14n. The appliance may include one or more storage processors and one or more devices upon which data is stored. The appliance may include software used in connection with performing data storage administration and other tasks such as storing the data of the hosts on the appliance, configuring the data storage for use by the hosts, backing up data from the storage system, and the like. As an example in connection with an email application server component that may be executed on the hosts 14a-14n, the data storage configuration tasks may include allocating storage for user accounts or mailboxes, specifying the devices (logical and/or physical) used to store the email data, specifying whether data replication is performed for disaster recovery, and the like.

In connection with an embodiment in which the data storage 12 is an appliance including hardware and software, the appliance may also include other software for performing different data services. For example, the appliance may include backup server software which interacts with software on the hosts 14a-14n when performing a backup operation.

In another embodiment, the data storage systems 12 may include one or more data storage systems, such as data storage arrays, offered by EMC Corporation of Hopkinton, Mass. Each of the data storage systems may include one or more data storage devices 13a-13n, such as disks. One or more data storage systems may be manufactured by one or more different vendors. Each of the data storage systems included in 12 may be inter-connected (not shown). Additionally, the data storage systems may also be connected to the host systems through any one or more communication connections that may vary with each particular embodiment and device in accordance with the different protocols used in a particular embodiment. The type of communication connection used may vary with certain system parameters and requirements, such as those related to bandwidth and throughput required in accordance with a rate of I/O requests as may be issued by the host computer systems, for example, to the data storage systems 12. It should be noted that each of the data storage systems may operate stand-alone, or may also be included as part of a storage area network (SAN) that includes, for example, other components such as other data storage systems. Each of the data storage systems may include a plurality of disk devices or volumes 13a-13n. The particular data storage systems and examples as described herein for purposes of illustration should not be construed as a limitation. Other types of commercially available data storage systems, as well as processors and hardware controlling access to these particular devices, may also be included in an embodiment.

In such an embodiment in which element 12 of FIG. 1 is implemented using one or more data storage systems, each of the data storage systems may include code thereon for performing an embodiment of the invention as described herein.

Servers or host systems, such as 14a-14n, provide data and access control information through channels to the storage systems, and the storage systems may also provide data to the host systems also through the channels. The host systems may not address the disk drives of the storage systems directly, but rather access to data may be provided to one or more host systems from what the host systems view as a plurality of logical devices or logical volumes (LVs). The LVs may or may not correspond to the actual disk drives. For example, one or more LVs may reside on a single physical disk drive. Data in a single storage system may be accessed by multiple hosts allowing the hosts to share the data residing therein. An LV or LUN (logical unit number) may be used to refer to the foregoing logically defined devices or volumes.

In following paragraphs, reference may be made to a particular embodiment such as, for example, an embodiment in which element 12 of FIG. 1 is an appliance as described above. However, it will be appreciated by those skilled in the art that this is for purposes of illustration and should not be construed as a limitation of the current invention.

Embodiments of the invention, as described in the following paragraphs, may be used in managing storage pool allocation. However, the described applications and implementations are only examples; embodiments of the invention may be adaptable to other applications and/or to the particular knowledge level of the user.

Figure 2:
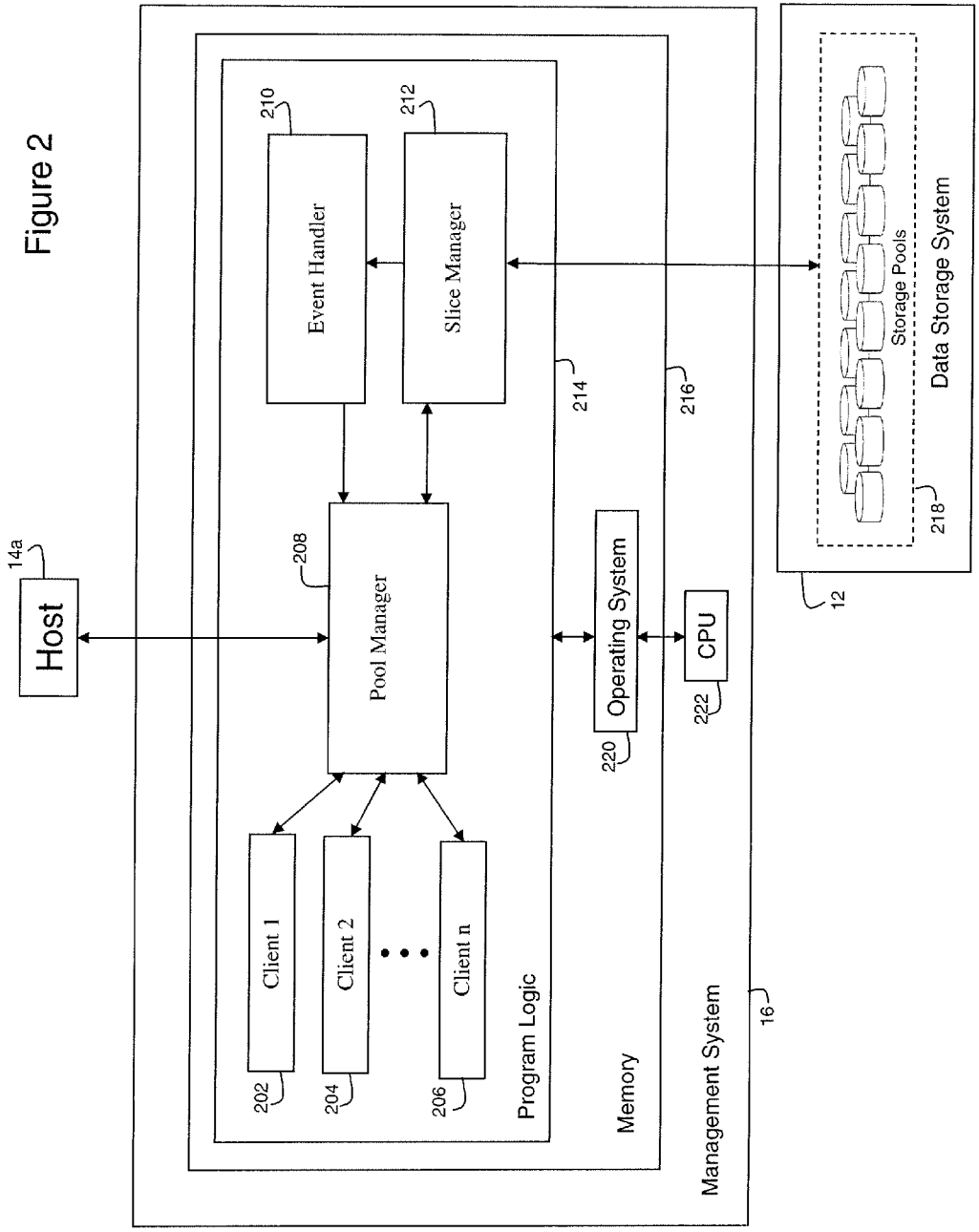
FIG. 2 is a schematic representation of components that may be used in connection with a storage system of FIG. 1.

FIG. 2 illustrates example hardware and/or software components that may be used in connection with FIG. 1 to help manage storage pool allocation. Management system 16 can be used to help manage one or more data storage systems 12. The data storage system 12 can encompass a number of storage devices that form storage pools 218. Management of the storage pools 218 can be centrally controlled by pool manager 208, which can be assisted by event handler 210 and slice manager 212. A number of client components of management system 16, as represented by clients 202, 204, and 206, may have access to one or more pools within storage pools 218. Hosts or servers, such as host 14a, may also access one or more pools within storage pools 218 by issuing I/O requests to pool manager 208 located within management system 16.

In at least one embodiment, client components (202, 204, and 206), pool manager 208, event handler 210, and slice manager 212 are used by program logic 214 in cooperation with operating system 220 and CPU 222 on management system 16. Program logic 214 may operate in electronic memory 216 and when executed by CPU 22 carry out method steps embodying the invention. Program logic 214 can be computer software although it is possible for it to be embodied in whole or part in hardware or firmware. For example, in some embodiments, program logic 214 can be implemented in an Application Specific Integrated Circuit (ASIC). Program logic 214 may be implemented such that program logic 214 is received and loaded into and executed by a machine to provide a specific apparatus for practicing embodiments of the invention. As such, a general purpose computer becomes a special purpose computer.

Storage pools 218 may be constructed from groups of physical devices with, for example, the Common Block File System (CBFS) managing the underlying structural operations. Each pool within storage pools 218 may contain slices of storage extents, each slice being associated with a storage space of a given size (e.g., 1 gigabyte slices). Conventionally, for example, the pools 218 may be used to help allocate TLUs and each TLU may consist of a number of slices. Conventionally, slices can be added or removed from a pool in storage pools 218 as needed—increasing or decreasing the amount of available space in the pool. For example, as storage space of a TLU is used, additional slices can be allocated for the TLU from the storage pool upon demand. Once allocated, the slices are removed from the pool such that the slices are no longer available to other TLUs for use. Conversely, as the amount of space used in a TLU decreases, slices may be deallocated and returned to the pool. (A description of storage pools and some information associated with storage pool creation is provided in the patent application entitled CONTROLLING MULTI-STEP STORAGE MANAGEMENT OPERATIONS, patent application Ser. No. 12/241,417, filed Sep. 30, 2008, which is hereby incorporated by reference herein.)

In some embodiments, slice manager 212 may be responsible for communicating with and directly accessing storage pools 218. In this embodiment, it may control the addition and removal of slices from the storage pools 218. In at least one embodiment, slice manager 212 can also maintain statistics as related to the pools 218. Example statistics may include, without limitation, available space in each storage pool (e.g., number of remaining unallocated slices in the pool), the number of allocated slices for each storage pool, the number of TLUs associated with each pool, and the rate of consumption for each pool. In some embodiments, statistics may be updated based on various factors such as the occurrence of an event. For example, slice manager 212 may update statistics for a pool after adding a slice to or removing a slice from the pool. Additionally, as discussed further below, slice manager 212 may also be responsible for notifying pool manager 208 that a certain event occurred. Thus, in some embodiments, if a slice is added or removed from a pool, slice manager 212 may, for example, update pool statistics and also notify pool manager 212 that a slice has been added or removed from the pool.

In at least one embodiment, certain slice manager 212 processes can be offloaded to an event handler 210. In some embodiments, offloading certain processes to the event handler 210 will help prevent the slice manager 212 from holding a lock on shared storage resources. In this embodiment, use of the event handler 210 to offload slice manager 212 processes could also avoid starting a transaction within slice manager's 212 distributed lock system.

Pool manager 208 is responsible for managing the use of storage pools 218 within data storage system 12. Pool manager 208 can communicate with storage pools 218 through slice manager 212. For example, in at least one embodiment, a host, such as host 14a, may send a write request to management system 16, which may be handled by pool manager 208. Pool manager 208 may then indirectly access the appropriate TLU in storage pool 218 through slice manager 212 to accomplish the write request. In an alternative embodiment, the functionalities provided by pool manager 208 and slice manager 212 may be combined. In yet another embodiment, pool manager 208 may have direct access to storage pools 218.

Because, in some embodiments, host write requests and components (e.g., data compression manager component) of management system 16 require pool 218 storage access, there may be competition for available pool storage space. Also, different storage requests may be of different priorities. For instance, host write requests may be of a higher priority than a component request. In an embodiment of the current invention, to help better control and prioritize the use of storage pools 218, components of management system 16 that require pool access may be required to "register" with pool manager 208 for Pool Client Notification (PCN) and specify policies that define different modes of allocation in relation to the storage pools 218. As discussed below, registration may include, for example, the process of setting values associated with a policy in a data registry. Once registered, the components can be considered clients of PCN. Client 202, for example, may be a storage compression manager registered for PCN. In an example embodiment, the compression manager must have specified an allocation mode policy that defines different allocation modes that may, for example, restrict the compression manager's ability to access to the pool.

In some embodiments, there may be one policy applied to all clients. In other embodiments, each client or group of clients may be associated with a unique policy. In this embodiment, each unique policy may be tailored to its associated client as each client may require, for example, different types of access or different amounts of storage space. For instance, if a client requires a minimal amount of storage space and writes to storage infrequently, its associated allocation mode policy may define allocation modes that more liberally allow storage access than a client that requires large amounts of storage space. It should also be noted that each unique policy may also consider priority such that some clients will be given greater priority to storage access than other clients.

In some embodiments, each client may also be responsible for acting upon or ignoring an allocation mode change. Thus, different clients may have the same allocation modes based on the same policy but may react differently when a new allocation mode is entered. How a particular client reacts to an allocation mode change depends on each client's implementation.

A simplified example of an allocation mode policy in accordance with an embodiment of the current invention consists of threshold values that correspond to allocation mode boundaries. In this example, when pool consumption reaches a level beyond a threshold, a new allocation mode is entered. For example, a policy can define two threshold values: Normal-to-Restricted threshold value and Restricted-to-Prohibited threshold value. These two threshold values in turn can define three allocation modes: Normal Allocation Mode, Restricted Allocation Mode, and Prohibited Allocation Mode. If the Normal-to-Restricted threshold value is set to eighty percent and the Restricted-to-Prohibited threshold value is set to ninety percent, and the total consumed space in the pool is less than eighty percent, the pool is in Normal Allocation Mode. If pool consumption is between eighty percent and ninety percent the pool is in Restricted Allocation Mode. And, if pool consumption is greater than ninety percent the pool is in Prohibited Allocation Mode. In an example embodiment having a registered client with a specified allocation mode policy using these thresholds, Normal Allocation Mode may provide unlimited pool access; Restricted Allocation Mode may allow only critical writes to the pool; and Prohibited Allocation Mode may preclude all write access to the pool.

In some embodiments, a more dynamic allocation mode policy may be used. For example, the rate of consumption of the pool may be used to dynamically calculate an allocation mode. For instance, if the rate of consumption has quickly increased over a short period of time, a new, more restrictive, allocation mode may be entered. In some embodiments, such information may be maintained, and made available, by the slice manager. Similarly, storage access information such as I/O traffic may also be used to define allocation modes.

Figure 3:
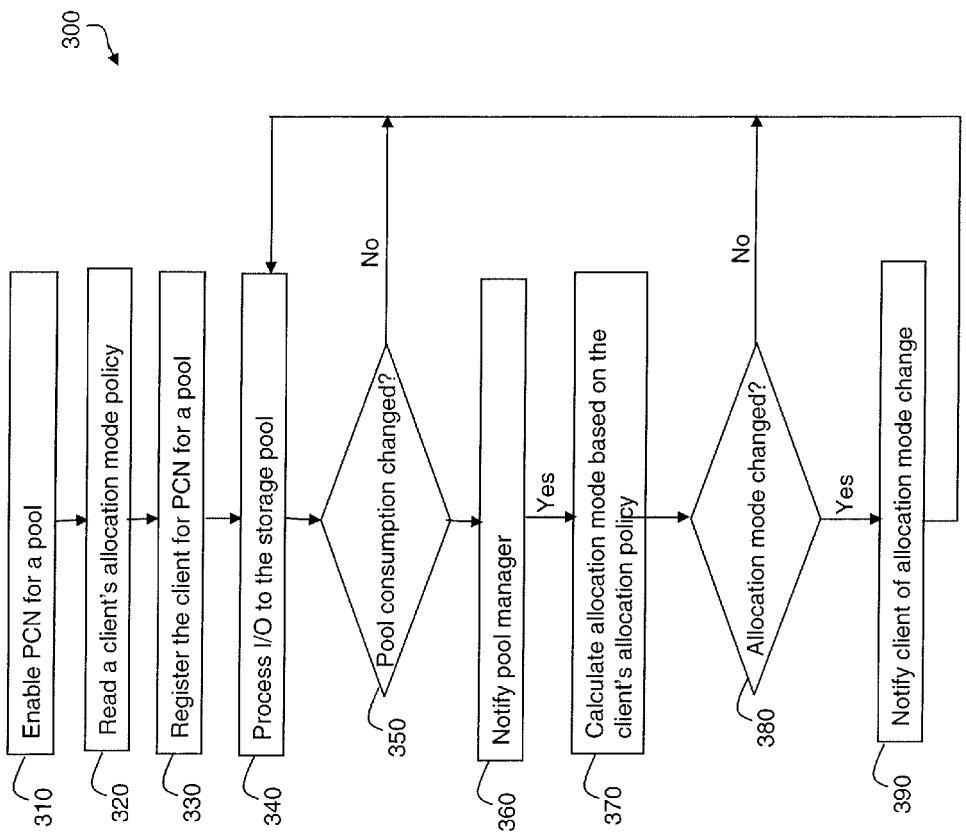
FIG. 3 is a flowchart of procedures that may be used with the embodiments of FIG. 1 and FIG. 2.

Referring to FIG. 3, flowchart 300 illustrates PCN notification steps that may be performed in accordance with an embodiment of the current invention. To enable PCN notifications for a pool, the pool must be initialized for PCN notifications (step 310). In some embodiments, this may be accomplished by defining callback functions for pool manager 208 that will be passed to and called by slice manager 212, for example, when slices are added or removed from a pool. The callback function can be responsible for calculating allocation modes. For instance, pool manager 208 may call a function within slice manager 212 to initialize a pool object, wherein the function would be passed a pointer to a pool manager 208 callback function. When a slice is removed from the initialized pool object, slice manager 212 may inform pool manager 208 of the removal by calling pool manager's 208 callback function. In some embodiments, the pool manager 208 can then calculate new allocation modes for clients (e.g., client 202) associated with the pool. When the callback function is called by slice manager 212 may vary depending on the specific implementation.

To enable PCN notifications for clients, an allocation mode policy must be retrieved for each client and made available for use by pool manager 208 (step 320). In some embodiments, retrieving an allocation mode policy may encompass reading registry values associated with the policy and storing those values in provided variables, for instance, at compile time. Using the thresholds-based allocation mode policy discussed above as an example, a registry value may exist for each threshold value (i.e., Normal-to-Restricted and Restricted-to-Prohibited). A particular embodiment may also contain default values that will be used when reading from registry fails or the registry contains invalid values.

Once allocation mode policies are received, pool manager 208 may register clients for PCN notifications (step 330). This may be accomplished, in some embodiments, by storing client information in a data collection accessible to pool manager 208 for later allocation mode calculations. The collection may contain, for example, all the necessary information to assist pool manager 208 in determining whether a new allocation mode has been entered for each client. It should be noted that each pool within storage pools 218 can have a separate collection associated with it as each pool can be associated with different clients. Thus, only clients that may be affected by a particular pool's consumption change will be notified.

Each I/O request to a pool, such as from host 14a, may result in a pool consumption change. Therefore, after each I/O request to a pool is processed (step 340), an embodiment of the current invention may check for a pool consumption change (step 350). As mentioned above, slice manager 212 may maintain statistics for each pool, such as, the number of remaining slices in the pool. In at least one embodiment, slice manager 212 updates the statistics after any modification to a pool. In this embodiment, slice manager 212 can notify pool manager 208 whenever statistics are updated (step 360). In alternative embodiments, slice manager 212 may automatically notify pool manager 208 upon the occurrence of certain events (step 360). For instance, slice manager 212 may notify pool manager 208 of a consumption change when a slice manager 212 function that results in a pool modification is called (e.g., adding or removing a slice). To notify pool manager 208, slice manager 212 may call the pool manager's 208 callback function, as described above.

In some embodiments, a PCN notification is not limited to the occurrence of a pool consumption change. For instance, certain requests or queries to a pool may trigger a notification. Likewise, an increase in host I/O traffic to a pool or to the storage system where the pool is located may trigger a notification. There is no limit as to what types of events may result in PCN notifications.

When pool manager's 208 callback function is called by slice manager 212 (step 360), pool manager 208 can calculate allocation modes for each client based on the clients' retrieved allocation mode policies, and data associated with the relevant pool (step 370). Allocation mode policies may be determined by values that were originally represented in a registry, as discussed above, and data associated with the relevant pool that may be passed to the pool manager's 208 callback function as parameters. In the threshold-based policy example where registry values denote thresholds, example parameters passed to the callback function may represent the total slices in a relevant pool and the total slices consumed in the pool. Pool manager 208 may then calculate a percentage of pool consumption using the parameter values and determine whether the calculated percentage falls within a new allocation mode (step 380). In some embodiments, determining whether a new allocation mode has been entered can be carried out by comparing the calculated allocation mode to an in-memory value containing the previously calculated allocation mode. In this embodiment, if a new allocation mode has been entered, the in-memory value may be updated to hold the new allocation mode.

To illustrate, a client's threshold-based policy may be represented by a first registry value set to the Normal-to-Restricted threshold value of eighty percent and a second registry value set to the Restricted-to-Prohibited threshold value of ninety percent. Currently, an in-memory value can specify that the client is in Normal Allocation Mode. If slice manager 212, for example, removes a slice from the relevant pool, slice manager 212 may call the pool manager's 208 callback function, passing as parameters a value of twenty to represent the total slices in the pool and a value of seventeen to represent the total consumed slices in the pool. Using these values, pool manager 208 can determine that the consumption percentage is now eighty-five percent. Comparing this value to the in-memory value specifying that the client is in Normal Allocation Mode, pool manager 208 can determine that the client has now entered a new allocation mode—Restricted Allocation Mode.

In some embodiments, slice manager 212 will utilize event handler 210 to process PCN events. This may help avoid complications that may arise from holding a distributed lock too long and also to avoid starting a transaction within slice manager's 212 distributed lock system. In this embodiment, slice manager 212 may have a pointer to an event handler 210 callback function. When, for example, a slice is added or removed from a pool, this callback function will be called. The event handler's 210 callback function can then queue a PCN event to the event handler's 210 thread. When the PCN event is processed, it can call the pool manager's 208 function responsible for calculating allocation modes, as discussed above.

If pool manager 208 determines that a new allocation mode has been entered for a client, pool manager 208 can then notify the client of the change (step 390). In some embodiments, the client may then act upon or ignore the notification. In this embodiment, it is the client's responsibility to determine the appropriate response to a PCN notification. For example, if a compression manager client is notified that it has entered Prohibited Allocation Mode for a pool, it may halt all storage requests to the pool. Alternatively, the compression manager may reduce the amount of storage requests. Similarly, if the compression manager client is notified that it has entered Normal Allocation Mode, it may issue storage requests to the pool without limit. Alternatively, it may ignore the notifications.

In some embodiments, clients can be given the option of querying pool manager 208 for the current allocation mode of a pool. When queried, pool manager 208 may return, for example, the in-memory allocation mode value for that pool as discussed above.

Figure 4:
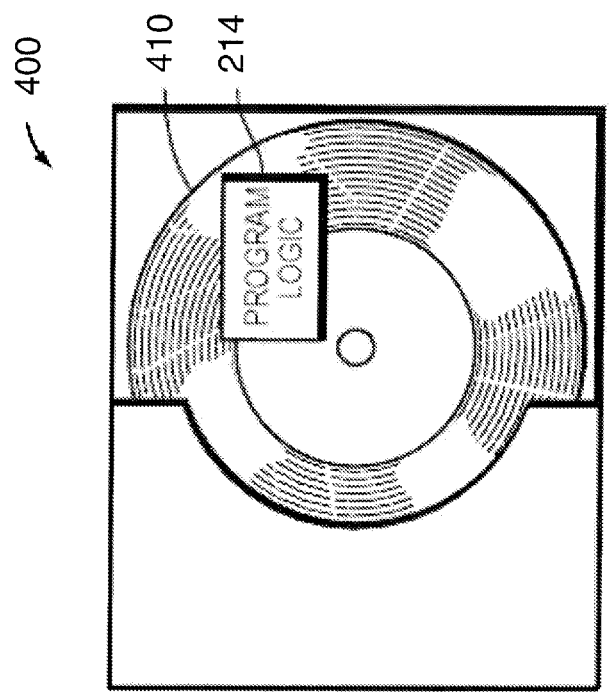
FIG. 4 shows an embodiment of the current invention as program logic embodied on a computer-readable medium.

The methods and apparatus of this invention may take the form, at least partially, of program code (i.e., instructions) embodied in tangible media, such as floppy diskettes, CD-ROMs, hard drives, random access or read only-memory, or any other machine-readable storage medium. FIG. 4 shows Program Logic 214 embodied on a computer-readable medium 410 as shown, and wherein the Logic is encoded in computer-executable code configured for carrying out the process of an embodiment of this invention and thereby forming a Computer Program Product 400.

The logic for carrying out the method may be embodied as part of the aforementioned system, which is useful for carrying out a method described with reference to embodiments shown in, for example, FIG. 2. For purposes of illustrating the present invention, the invention is described as embodied in a specific configuration and using special logical arrangements, but one skilled in the art will appreciate that the device is not limited to the specific configuration but rather only by the claims included with this specification.

Although the foregoing invention has been described in some detail for purposes of clarity, it will be apparent that certain changes and modifications may be practiced within the scope of the appended claims. Accordingly, the present implementations are to be considered as illustrative and not restrictive, and the invention is not to be limited to the details given herein, but may be modified within the scope and equivalents of the appended claims.

In reading the above description, persons skilled in the art will likely realize that there are variations that can be applied to the methods and systems described. Also, the foregoing specification, the invention has been described with reference to specific embodiments thereof. Accordingly, various modifications and changes may be made to the specific embodiments without departing from the broader spirit and scope of the invention as set forth in the appended claims.

What is claimed is:

1. A method of managing allocation of a storage pool in a data storage system, the method comprising the computer-executed step of:
   initializing a first storage pool selected from a set of storage pools for pool client notification, wherein the storage pool includes thin logical units and the storage pool receives host write requests;

providing multiple data storage system clients, wherein the multiple data storage system clients access the first storage pool;
retrieving an allocation mode policy for each of the multiple data storage system clients, wherein the allocation mode policy defines different modes of allocation in relation to the set of storage pools;
registering each of the multiple data storage system clients for pool client notification for the first storage pool; and
calculating a first allocation mode for each of the registered multiple data storage system clients based on the retrieved allocation mode policy, wherein the first allocation mode is used in managing allocation of the first storage pool.

2. The method of claim 1, wherein the allocation mode policy is associated with a first client selected from the multiple data storage system clients.

3. The method of claim 2, wherein a second allocation mode policy is associated with a second client selected from the multiple data storage system clients.

4. The method of claim 2, wherein the first client is notified of the first allocation mode.

5. The method of claim 2, wherein the first client queries for the first allocation mode.

6. The method of claim 1, wherein the allocation mode policy uses threshold values.

7. The method of claim 1, wherein the allocation mode policy is dynamic.

8. The method of claim 1, wherein the allocation mode policy is static.

9. The method of claim 1, wherein a second allocation mode for each of the registered multiple data storage system clients based on the retrieved allocation mode policy.

10. The method of claim 1, wherein the first allocation mode is calculated upon an event.

11. A system for use in managing allocation of a storage pool in a data storage system, the system comprising:
a data storage system including a storage pool;
a data storage management system in communication with the data storage system; and
computer-executable program logic in communication with the data storage management system that is configured to cause the following computer-executed step of:
initializing a first storage pool selected from a set of storage pools for pool client notification, wherein the storage pool includes thin logical units and the storage pool receives host write requests;
providing multiple data storage system clients, wherein the multiple data storage system clients access the first storage pool;
retrieving an allocation mode policy for each of the multiple data storage system clients, wherein the allocation mode policy defines different modes of allocation in relation to the set of storage pools;
registering each of the multiple data storage system clients for pool client notification for the first storage pool; and
calculating one or more allocation modes for each of the registered multiple data storage system clients based on the retrieved allocation mode policy, wherein the allocation mode is used in managing allocation of the first storage pool.

12. The system of claim 11, wherein the allocation mode policy is associated with a first client selected from the multiple data storage system clients.

13. The system of claim 12, wherein a second allocation mode policy is associated with a second client selected from the multiple data storage system clients.

14. The system of claim 12, wherein the first client is notified of the first allocation mode.

15. The system of claim 12, wherein the first client queries for the first allocation mode.

16. The system of claim 11, wherein the allocation mode policy uses threshold values.

17. The system of claim 11, wherein the allocation mode policy is dynamic.

18. The system of claim 11, wherein a second allocation mode for each of the registered multiple data storage system clients based on the retrieved allocation mode policy.

19. The system of claim 11, wherein the first allocation mode is calculated upon an event.

20. A computer program product for use in managing allocation of a storage pool in a data storage system, the computer program product comprising a non-transitory computer-readable storage medium encoded with computer-executable program logic configured to enable:
initializing a first storage pool selected from a set of storage pools for pool client notification, wherein the storage pool includes thin logical units and the storage pool receives host write requests;
providing multiple data storage system clients, wherein the multiple data storage system clients access the first storage pool;
retrieving an allocation mode policy for each of the multiple data storage system clients, wherein the allocation mode policy defines different modes of allocation in relation to the set of storage pools;
registering each of the multiple data storage system clients for pool client notification for the first storage pool; and
calculating one or more allocation modes for each of the registered multiple data storage system clients based on the retrieved allocation mode policy, wherein the allocation mode is used in managing allocation of the first storage pool.

* * * * *